United States Patent [19]

Beck et al.

[11] Patent Number: 4,692,355

[45] Date of Patent: Sep. 8, 1987

[54] METHOD FOR IMPARTING FLAME RESISTANCE TO WOOD USING DIMETHYL (OXIRANYLMETHYL) PHOSPHONATE AND A CATALYST

[75] Inventors: H. Nelson Beck, Walnut Creek; Dalton C. MacWilliams, Alamo, both of Calif.

[73] Assignee: The Dow Chemical Company, Midland, Mich.

[21] Appl. No.: 866,539

[22] Filed: May 23, 1986

[51] Int. Cl.$^4$ .................. D06M 1/02; C09D 5/16; C09D 5/18; B05D 3/12
[52] U.S. Cl. .................. 427/297; 8/127.1; 106/18.18; 427/370
[58] Field of Search ............... 106/18.13, 18.14, 18.18; 427/369, 370, 384, 393, 386, 297; 428/541, 704, 921; 8/127.1

[56] References Cited

U.S. PATENT DOCUMENTS

| | | | |
|---|---|---|---|
| 2,627,521 | 2/1953 | Coover | 106/176 X |
| 4,210,565 | 7/1980 | Emmons | 427/393 X |
| 4,263,372 | 4/1981 | Emmons et al. | 427/393 X |

FOREIGN PATENT DOCUMENTS 46-11572  3/1971  Japan .................. 106/18.18

*Primary Examiner*—Michael R. Lusignan

[57] ABSTRACT

A method and compositions for imparting flame resistance to exposed surfaces of wood by impregnating the wood with dimethyl(oxiranylmethyl)phosphonate (DMOMP) and a catalyst and then reacting wood surfaces with the DMOMP is described. The catalysts are preferably Lewis acids or Lewis bases. The resulting treated wood products are useful in applications where flame resistance is important.

17 Claims, No Drawings

METHOD FOR IMPARTING FLAME RESISTANCE TO WOOD USING DIMETHYL (OXIRANYLMETHYL) PHOSPHONATE AND A CATALYST

BACKGROUND OF THE INVENTION

1. Field of the Invention

The present invention relates to an improved method and compositions for imparting flame resistance to wood using dimethyl(oxiranylmethyl)phosphonate (DMOMP) and a catalyst as impregnants. In particular, the present invention relates to impregnating of DMOMP and a catalyst into the wood and reacting the DMOMP with the wood in the presence of the catalyst to chemically bind the DMOMP in situ in the wood.

2. Prior Art

U.S. Pat. No. 2,627,521 to Coover describes the use of oxirane containing phosphonates, including DMOMP, in cellulose derivatives and in polyvinyl resins as plasticizers and stabilizers. There is no suggestion that DMOMP can be used to impregnate the exposed surfaces of wood to impart flame resistance. It is believed that the "cellulose derivatives" referred to by Coover are polymers prepared from cellulose derivatives (e.g. cellulose acetate). Further, no use of catalysts for reacting the DMOMP with wood is described. Coover also describes a process which can be used to prepare DMOMP.

The use of wood for shingles and siding for houses and the like is well known. The problem is to impart some level of flame resistance to these and other wood products such as plywood.

OBJECTS

It is therefore an object of the present invention to provide a method and compositions for imparting flame resistance to wood by impregnating a surface of the wood with DMOMP and a catalyst and then reacting the surface with the DMOMP. Further it is an object of the present invention to provide a method which is simple and economical to perform. These and other objects will become increasingly apparent by reference to the following description.

GENERAL DESCRIPTION

The present invention relates to a method for imparting flame resistance to wood which comprises: impregnating exposed surfaces of the wood with dimethyl(oxiranylmethyl)phosphonate and with a catalytic amount of a catalyst which promotes reaction of an epoxide group; and reacting the dimethyl(oxiranylmethyl)phosphonate with the wood to produce a flame resistant treated wood with the reacted phosphonate chemically bound in the treated wood.

The present invention also relates to a method for imparting flame resistance to a wood having a fabricated shape which comprises: impregnating exposed surfaces of the wood having the fabricated shape with dimethyl(oxiranylmethyl)phosphonate and with a catalytic amount of a catalyst which promotes reaction of an epoxide group in a confined chamber at a differential pressure; and reacting the dimethyl(oxiranylmethyl)-phosphonate with the wood at an elevated temperature to produce a flame resistant treated wood having the fabricated shape with the reacted phosphonate chemically bound in the treated wood.

Further the present invention relates to a composition for imparting flame resistance to wood which comprises: dimethyl(oxiranylmethyl)phosphonate; and a Lewis acid or Lewis base catalyst dispersed in the phosphonate which promotes reaction with the wood, wherein the catalyst is present in an amount of between between 0.1 and 5 percent by weight of the phosphonate.

The catalyst used promotes the reaction of an epoxy group and is preferably a Lewis acid or Lewis base. The Lewis acid catalysts are for instance boron trifluoride complexes with amines, such as boron trifluoride monoethylamine, as well as other boron complexes; transition metal salts such as zinc chloride and zinc tetrafluoroborate; boric acid esters and the like. The Lewis bases are generally tertiary amines such as triethylamine; piperidine; benzyl dimethylamine and the like. The tertiary amines can include aromatic or aliphatic groups or mixtures thereof. The catalysts can be catalytic hardeners or curing agents for epoxy resins and are believed to produce reactive intermediates I and II according to the reactions

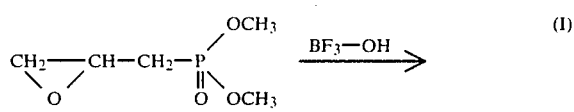

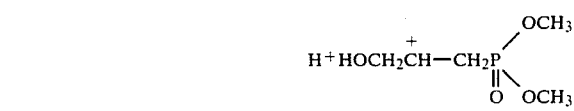

for Lewis acids; and

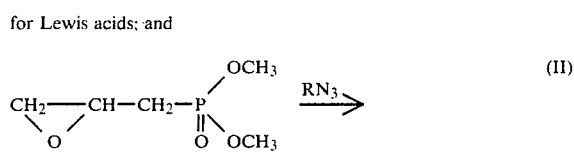

for Lewis bases.

The amount of catalyst is preferably between about 0.2 and 2 percent by weight of the DMOMP. Generally the catalyst is dissolved or dispersed in the DMOMP alone or in the non-reactive carrier.

U.S. patent application Ser. No. 809,686, filed Dec. 16, 1985, now U.S. Pat. No. 4,654,277, patented Mar. 31, 1987, by the inventors herein describes the impregnation and reaction of DMOMP with wood. This method works well; however, the temperatures for reacting the DMOMP with the wood are relatively high. The catalysts herein reduce the temperature for the reaction with wood.

The exposed surfaces of wood which are impregnated by the method of the present invention can be in the form of solid wood, cardboard, clipboard, pressboard, particle board or a reconstituted wood fiber product. The wood can be in the form of plywood with multiple layers. All that is necessary is that there be a wood surface which is exposed for impregnation by the DMOMP and the catalyst. As used herein the term "wood" means any solid wood or wood containing product which has the necessary porosity for impregnation.

The exposed surface of the wood preferably is at least partially dried so that there are open pores in the exposed surface. The woods can be soft or hard and of any species. There are numerous publications describing the pore characteristics of various species of wood and a discussion can be found in Kirk-Othmer, Volume 24, pages 579 to 611 (1984). Page 585 shows the relative liquid permeability of woods as a result of the flow of a liquid under pressure over the wood. Usually soft woods, particularly coniferous woods, have pores which are more readily impregnated by the method of the present invention than hard woods. Cedar is an example of a wood which has poor permeability even though it is relatively soft. Coniferous woods contain natural resins which can aid in binding the DMOMP.

The drying of the wood is by conventional means. Freshly cut wood contains about 47 to 50% by weight moisture depending upon the species and growing conditions. Air dried wood contains about 20% by weight moisture and kiln dried wood contains about 6% by weight moisture. It will be appreciated that the percent moisture removed from the wood is not important so long as there are exposed pores in the surface of the wood. Preferably the percent moisture is between 0 and 30% by weight of the purpose of the present invention.

The wood can have any convenient form or shape so long as it can be impregnated by the DMOMP and the catalyst. A preferred form for impregnation by the method of the present invention is siding or roofing shingles which are usually composed of solid wood. The treatment of cedar siding and shingles is especially preferred. It is also preferred to impregnate at least the outer plies or layers of plywood sheets which can be made of various species of wood depending upon the application.

The flammability of the treated wood product is tested by the Limiting Oxygen Index (LOI) method (ASTM D2863-70). This method measures flammability as function of the percentage of oxygen in nitrogen to which the wood is exposed as a flame as applied to a surface. This is compared to the flammability of untreated wood in air. Wood was considered to "burn" if it (a) remained aflame for 60 seconds or (b) was completely consumed by the flame. Untreated dry cedar wood burns in 21% oxygen and thus its LOI is 21%. It will be appreciated that only the treated surface(s) of the wood is exposed to the flame since untreated surfaces would have normal flammability. The method of the present invention is able to significantly increase the LOI of the treated wood as a result of impregnating and reacting it with DMOMP. The resulting wood has an LOI of above 30 percent oxygen, preferably between 30 and 50 percent oxygen. The wood preferably contains DMOMP at least at the exposed surfaces in an amount which is between about 14 and 44 percent of the weight of the wood to a depth of about 5 to 10 mm. The total weight percent of DMOMP impregnated into the wood thus depends upon the thickness of the wood being treated.

The impregnation of the wood can be accomplished by any convenient method preferably by absorption of DMOMP and the catalyst in admixture alone or in a non-reactive liquid carrier. It is possible to spray the DMOMP and catalyst onto the wood at a velocity sufficient to impregnate the pores of the wood. It is also possible to (1) pressurize the DMOMP and catalyst into the wood or (2) evacuate air from the pores of the wood with a partial vacuum which removes air from the wood so that the DMOMP and catalyst are more readily impregnated into the pores. These latter methods rely upon differential pressures from ambient pressures.

Where elevated pressures are used, these can be between about 5 and 1000 psig (351.5 to 70360 gms per square cm). Preferably the elevated pressures are between about 20 and 100 psig (1406 and 7030 gms per square cm). Where a vacuum is used for the impregnation, the wood can be coated with the DMOMP and catalyst and provided in a confined space. The partial vacuum is then applied to remove air from the pores and then to impregnate the DMOMP into the wood. Alternatively the wood can be immersed in the DMOMP and catalyst in a confined space and then the vacuum applied to remove air from the pores and then impregnate the wood. Vacuums between $-3$ and $-14.5$ psig ($-210.9$ to $-1019.35$ gms per square cm) can be used.

For ease of handling, preferably the DMOMP and catalyst mixture contains a ratio of between about 0.01 and 19 parts liquid carrier to DMOMP. Water is the most convenient and inexpensive liquid carrier; however, other unreactive liquid carriers can be used such as toluene. All of these variations will be obvious to those skilled in the art.

After the DMOMP is impregnated into the wood, it is reacted with the wood by heating the wood at temperatures above about 80° C., preferably between about 80° C. and 170° C. A temperature between about 80° and 150° C. is most preferred. The DMOMP is stable up to 190° C., but higher heating temperatures above 150° C. cause discoloration and sometimes charring of the wood surfaces because of the faster reaction.

The heating is usually conducted over a period of at least 4 hours. Preferably the DMOMP is reacted with the wood over a period of between about 4 and 8 hours depending upon the temperature, since higher temperatures produce a faster reaction time.

SPECIFIC DESCRIPTION

The following examples show the results achieved within the use of several catalysts compared to the results without a catalyst.

Cedar wood was impregnated in two stainless steel pressure bombs (one with length 8½", O.D. 1½", and I.D. 13/16" (21.59 cm, O.D. 3.81 and I.D. 2.06 cm; the other 10½", 1 3/10", and 1 1/10" (26.67 cm, O.D. 3.30 cm and I.D. 2.79 cm), by soaking splints in various concentrations of aqueous DMOMP at 40 psi (2812 grams per square cm) for 24 hours. The splints were previously oven-dried at 90° C. before impregnation. The splints were 5 to 10 mm thick, 8 to 10 mm wide, and 70 to 100 mm long. The catalyst impregnated splints were dried in a circulating oven for 8 hours at 80° C. The non-catalyst impregnated splints were dried at 150° C. for 24 hours. The splints were extracted with flowing water at room temperature for 24 hours, and finally oven dried at 80° C. for 24 hours.

Phosphorus analyses on impregnated splints were obtained colorimetrically as molybdenum blue using the stannous chloride test method (Willard, H. H. and H. Diehl, Advanced Quantitative Analysis, Von Nostrand, New York pg 207 (1943)). Neat DMOMP, molecular weight 166.155, contains 18.65% phosphorus. The DMOMP concentration in the wood was obtained by multiplying the percent phosphorus by 100/18.65 or 5.362.

The cedar wood splints were impregnated and then reacted with DMOMP. The data for these experiments are shown in Table I and include the concentration of DMOMP in the impregnating liquid, the impregnation time, the LOI values, and the concentration of phosphorus and DMOMP found in the wood.

sq. cm), is useful in increasing the impregnation rate and the completeness and homogeneity of penetration.

The flame resistance that DMOMP imparts to wood is related to several essential variables. Such variables include the amount of DMOMP remaining in the wood, the concentration of DMOMP in the impregnating liquid, the time of impregnation, the temperature of bonding, i.e. the probable reaction of the DMOMP with

TABLE I

| DMOMP Conc.[a] | "Curing" Temperature, °C.[b] | Catalyst | Catalyst Conc., Wgt. % | Conc. of P, %, in Wood | Conc. of DMOMP, %, in Wood | P, LOI, % O$_2$ |
|---|---|---|---|---|---|---|
| 30  | 150[c] | —                  | —   | 8.09 | 43.4 | 48–50 |
| 100 | 150[c] | —                  | —   | 7.42 | 39.8 | 46–48 |
| 30  | 80     | —                  | —   | 0.57 | 3.1  | 27    |
| 30  | 80     | ZnCl$_2$           | 0.2 | 3.34 | 17.9 | 32    |
| 100 | 80     | ZnCl$_2$           | 0.2 | 1.67 | 9.0  | 30.32 |
| 30  | 80     | ZnCl$_2$           | 2.0 | 1.79 | 9.6  | 31    |
| 100 | 80     | ZnCl$_2$           | 2.0 | 2.97 | 15.9 | 30    |
| 30  | 80     | BF$_3$ monoethylamine | 1.0 | 1.57 | 8.4  | 30–32 |
| 100 | 80     | BF$_3$ monoethylamine | 1.0 | 1.54 | 8.3  | 31–32 |
| 30  | 80     | Zn(BF$_4$)$_2$     | 1.0 | 1.92 | 10.3 | 32    |
| 100 | 80     | Zn(BF$_4$)$_2$     | 1.0 | 1.36 | 7.3  | 32–33 |
| 30  | 80     | Triethylamine      | 1.0 | 1.9  | 10.2 | 30–31 |
| 100 | 80     | Triethylamine      | 1.0 | 1.4  | 7.5  | 33    |

[a]Concentration of DMOMP, volume percent, in the impregnating liquid.
[b]Impregnated at 40 psi for 24 hours followed by heating at the "curing" temperature for 8 hours, water extraction for 24 hours, and finally drying at 80° C. for 8 hours.
[c]"Curing" time was 24 hours.

Without the catalyst the impregnation of DMOMP into cedar wood has been followed by a heating or "curing" period at 150° C. for 24 hours in these examples and as described in U.S. patent application Ser. No. 809,686, filed Dec. 16, 1985. This temperature was found to be essential to "bond" the fire retardant to the cellulose so that it would not be removed by water. This temperature resulted in significant darkening of the wood and possibly produced other adverse effects such as a lower density and increased porosity of the wood, as well as considerable energy usage.

The catalysts promoted the bonding reaction and allowed it to proceed at a lower temperature and in less time. The four catalysts tested, i.e., zinc chloride, boron trifluoride monoethylamine, zinc tetrafluoroborate, and triethylamine, are conventional Lewis acid and Lewis base catalysts which were found to be effective. Thus, compared to the control using 30% aqueous DMOMP as the impregnating liquid, the catalysts resulted in LOI value increases of 3 to 6 percent oxygen. These increases were accompanied by 2.7 to 5.8 times more DMOMP in the wood than when no catalyst was employed. The use of the higher bonding temperatures without the catalysts resulted in high concentrations of DMOMP in the wood and in higher LOI values than were obtained using catalysts at the lower temperatures as is expected. Thus higher temperatures are preferred even with the catalysts although these are generally lower than those temperatures needed without the catalyst. There was significantly less darkening of the wood and less density loss when lower temperatures and catalysts were used.

The splints used in the examples were selected at random and differed considerably in the grain, the wood density and porosity, the number, size, and type of knots and other imperfections. These inhomogeneities in the wood are reflected in the results. The impregnation varied as to completeness and homogeneity and the resulting LOI values for "identical" specimens varied occasionally by about five percentage points. Increased pressure, i.e. greater than 40 psig (2812 gm per the wood cellulose hydroxyl groups or other components of the wood. Another possible variable is the size, geometry, liquid capacity, etc. of the pressure vessel used for impregnation. The homogeneity of impregnation and the reproducibility of subsequent data depend to a great extent upon the quality of the wood used, e.g. the density, presence of knots, porosity, wood grain configuration, voids, and the like.

Veneer may be treated in the same manner as the splints to provide flame retardance. Other wood products can be treated in the same manner.

It is believed that those skilled in the art will be able to easily repeat the Examples with other wood, pressures, temperatures and catalysts and that these variations will be obvious to those skilled in the art based upon the present specification.

We claim:

1. A method for imparting flame resistance to wood which comprises:
    (a) impregnating exposed surfaces of the wood with a reactive amount of dimethyl(oxiranylmethyl)phosphonate and with a catalytic amount of a catalyst which promotes reaction of an epoxide group; and
    (b) reacting the dimethyl(oxiranylmethyl) phosphonate with the wood to produce a flame resistant treated wood with the reacted phosphonate chemically bound in the treated wood.

2. The method of claim 1 wherein the catalyst is selected from a Lewis acid or a Lewis base.

3. A method for imparting flame resistance to a wood having a fabricated shape which comprises:
    (a) impregnating exposed surfaces of the wood having the fabricated shape with a reactive amount of dimethyl(oxiranylmethyl)phosphonate and with a catalytic amount of a catalyst which promotes reaction of an epoxide group in a confined chamber at a differential pressure; and
    (b) reacting the dimethyl(oxiranylmethyl)phosphonate with the wood at an elevated temperature to produce a flame resistant treated wood having the fabricated shape with the reacted phosphonate chemically bound in the treated wood.

4. The method of claim 3 wherein the acid is selected from a Lewis acid or a Lewis base.

5. The method of claim 1 wherein the catalyst is selected from the group consisting of zinc chloride, borontrifluoride, bromoethylamine, zinc tetrafluoroborate and triethylamine.

6. The method of claim 3 wherein the differential pressure for impregnating the wood is an elevated pressure between about 5 and 1000 psig or a reduced pressure between about −3 and −14.5 psig.

7. The method of claim 3 wherein the dimethyl(oxiranylmethyl)phosphonate is reacted with the wood at a temperature above about 80° C. and for time sufficient to bond the phosphonate in the wood.

8. The method of claim 3 wherein the dimethyl phosphonate and catalyst impregnated into the wood in admixture with a non-reactive liquid carrier in a ratio by weight of the liquid carrier to dimethyl(oxiranylmethyl)phosphonate between about 0.01 and 19 to 1 and after impregnation the liquid carrier is removed prior to reacting the dimethyl(oxiranylmethyl)phosphonate with the wood.

9. The method of claim 8 wherein the liquid carrier is water.

10. The method of claim 3 wherein the pressure for impregnating the wood is between about 20 and 100 psig, the dimethyl(oxiranylmethyl)phosphonate and catalyst are impregnated into the wood with a non-reactive liquid carrier, after impregnation the liquid carrier is removed from the wood prior to reacting the dimethyl(oxiranylmethyl)phosphonate with the wood, and the dimethyl(oxiranylmethyl)phosphonate is reacted with the wood at a temperature of between about 80° C. and 150° C. and for a time sufficient to bond the dimethyl(oxiranylmethyl)phosphonate in the wood.

11. The method of claim 10 wherein the liquid carrier is water.

12. The method of claim 3 wherein the reaction of the dimethyl(oxiranylmethyl)phosphonate with the wood is conducted at a temperature between about 80° C. and 150° C.

13. The method of claim 3 wherein the wood is cedar.

14. A composition for imparting flame resistance to wood which comprises:
  (a) dimethyl(oxiranylmethyl)phosphonate; and
  (b) a Lewis acid or Lewis base catalyst dispersed in the phosphonate which promotes reaction with the wood, wherein the catalyst is present in an amount of between about 0.1 and 5 percent by weight of the phosphonate.

15. The composition of claim 14 wherein the catalyst is selected from the group consisting of boron trifluoride monoethylamine, zinc tetrafluoroborate, zinc chloride and triethylamine.

16. The composition of claim 14 wherein the catalyst and the phosphonate are dissolved in a non-reactive liquid carrier.

17. The composition of claim 16 wherein the carrier is water.

* * * * *